Jan. 23, 1945.  C. S. ASH  2,367,748
DUAL WHEEL ASSEMBLY
Filed April 8, 1942  2 Sheets-Sheet 1

INVENTOR
C. S. Ash
ATTORNEY

Jan. 23, 1945.   C. S. ASH   2,367,748
DUAL WHEEL ASSEMBLY
Filed April 8, 1942   2 Sheets-Sheet 2

INVENTOR
C. S. Ash
BY
H. N. Dunham
ATTORNEY

Patented Jan. 23, 1945

2,367,748

UNITED STATES PATENT OFFICE 2,367,748

DUAL WHEEL ASSEMBLY

Charles S. Ash, Milford, Mich.

Application April 8, 1942, Serial No. 438,106

4 Claims. (Cl. 301—36)

The present invention relates to new and useful improvements in dual wheel assemblies, and more particularly to new and useful improvements in dual wheels for use with semi-trailers and other non-driven dual wheels of road vehicles.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

The present invention has for its object the provision of a novel and improved dual wheel assembly particularly adapted for use with trailers, semi-trailers and other road vehicles. A further object of the invention is the provision of the novel and improved dual wheel assembly using demountable wheels of conventional form, and in which the braking force is applied to one of the wheels through an axle shaft, thereby permitting the provision of ample braking area, and at the same time separating the braking means for the two wheels. Still another object of the invention is the provision of a dual wheel assembly utilizing duplicate demountable wheels which are connected together for coaxial independent rotation, and in which the inner wheel may be demounted and remounted with a minimum of difficulty, and without requiring the removal of the outer wheel or rim from its hub.

In accordance with the illustrative embodiment of the invention, the dual wheel assembly includes an axle tube of moderate length on which is freely rotatable an elongated hub member to which the inner wheel is demountably attached. On the outer portion of the elongated hub is rotatably mounted a shorter hub member to which the outer wheel is demountably attached. The inner wheel and its hub are held against axial movement by means of its bearings, while the outer wheel and its hub are held against axial movement by means of an axle shaft which extends from the outer end of the axle tube, is rotatably mounted and held against axial movement within the axle tube, and is detachably connected to the outer wheel hub. Thereby the outer wheel hub may be removed and replaced without disturbing the axle shaft. Suitable braking means are provided for the wheels and may comprise a brake drum mounted on the inner side of the inner wheel and rotatable therewith, and a second brake drum mounted at the inner end of the axle shaft and rotatable with the outer wheel, suitable brake shoes or other cooperating braking means being provided for each of the brake drums. The dual wheel and brake assembly is connected to the vehicle in any suitable way, as by springs directly connected to the axle tubes, or by mounting the axle tubes in a separate frame.

It will be understood that the foregoing general description and the following detailed description as well are exemplary and explanatory of the invention but are not restrictive thereof.

Figure 1:
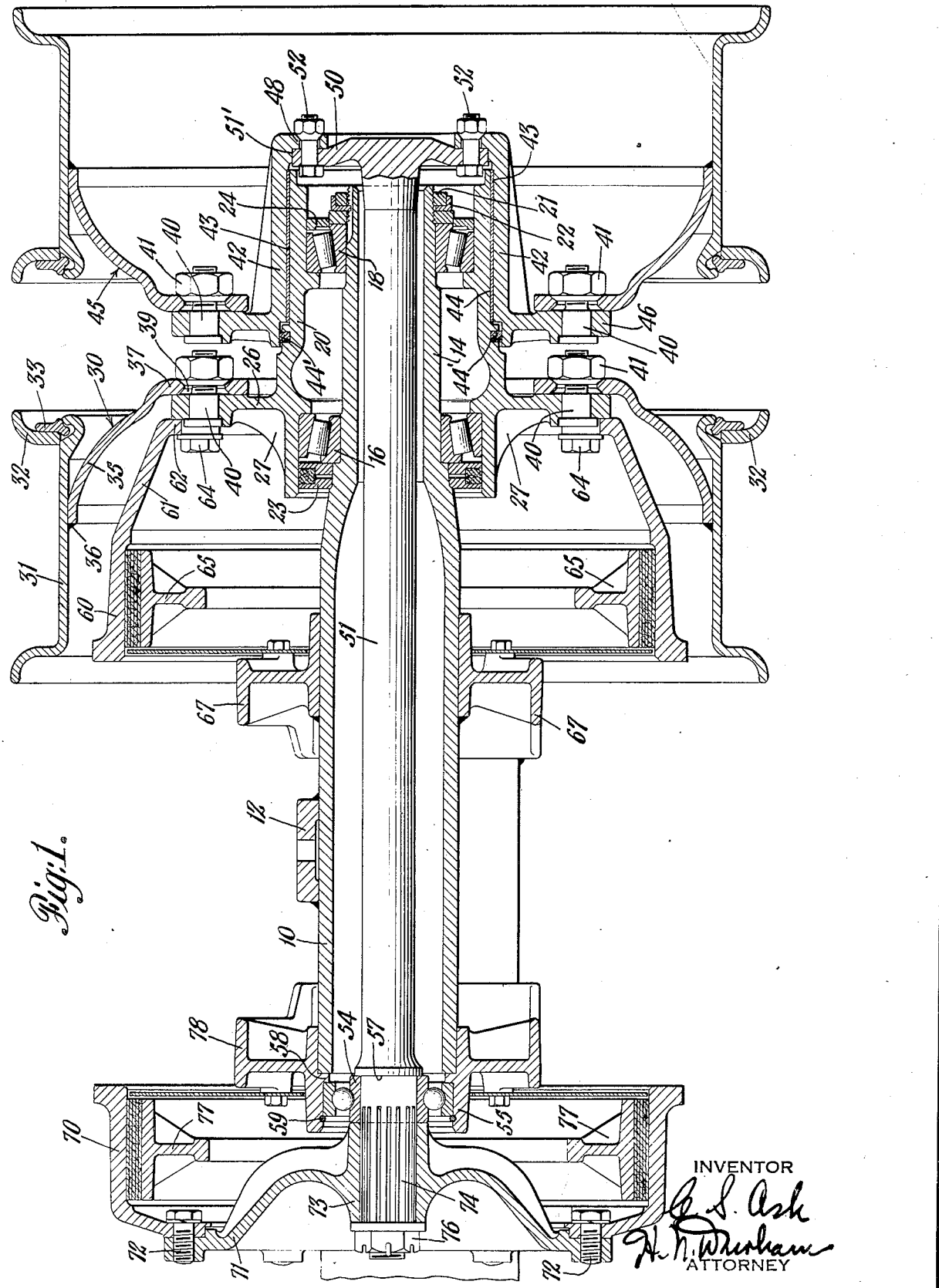
Figure 1 is a longitudinal vertical section showing a typical and illustrative embodiment of the present invention.

Referring now in detail to the illustrative embodiment of the invention as shown by Figure 1 of the drawings there is provided an axle tube 10 which extends from an outer side of the vehicle toward, but not to, the center of the vehicle and this axle tube is provided with a spring pad 12 on which may be secured a conventional leaf spring by which the axle tube 10 is secured to the vehicle. At its outer end the axle tube 10 is reduced in diameter, as at 14, and is provided with bearing seats on which the tapered roller bearings 16 and 18 are seated. An inner wheel hub 20 of generally tubular construction is mounted on the axle tube end 14 by means of the bearings 16 and 18, which not only provide for its rotation, but also hold the hub 20 against axial movement with reference to the axle tube. Bearings 16 and 18 are seated within the hub 20 in the usual manner, the outer bearing 18 being secured by means of nut 21 and lock washer 22 to the threaded end of the axle tube 10, and both bearings are sealed against dirt by means of the seals 23 and 24.

On its inner half, the inner wheel hub 20 is provided with a radially extending disk-like portion 26 formed integrally with the hub 20 and strengthened by means of the webs 27, and this disk-like portion is provided with suitable wheel mounting means by which the demountable wheel 30 and its permanently attached rim 31, may be mounted and held rigidly to the hub 20.

The inner wheel 30 is shown as of a conventional Budd demountable wheel type, and comprises the pneumatic tire support rim 31 having the usual removable flange 32 and locking ring 33 for securing the tire to the rim. To this rim is permanently attached the wheel portion comprising a deeply dished member 35 which is securely welded to the circular portion of the rim, as at 36, while the radially inward portion of the dish 35 terminates in a flat disk-like member 37 which is circularly apertured to pass over the wheel hub, and is provided with a circular series of beveled holes 39 to receive the correspondingly arranged series of wheel mounting studs 40 and their nuts 41. The studs 40 and their nuts 41 are securely seated in the outer or peripheral edge of the disk portion 26, and in general may be similar to the disclosure of my copending application, Serial Number 418,118, filed November 7, 1941.

The outer wheel hub 42 comprises a generally cylindrical member extending approximately one-half the length of the inner wheel hub 20 and provided with an internal bushing 43 of cylindrical shape to fit over the journal 44 forming the periphery of the outer half of the inner wheel hub 20, thereby providing for the free and independent rotation of the outer wheel hub 42 on the inner wheel hub 20. At its inner end, hub 42 is provided with a radially extending integral disk-like portion 46 which carries the wheel mounting studs 40 arranged in a circular series. The outer wheel 45 is preferably a duplicate of the inner wheel 30, and is demountably attached to the outer wheel hub in the same manner. A felt washer 44' is seated in an annular groove in the hub 20 and bears against the inner end of hub 42 to exclude dirt from the journal 44 and bushing 43.

Means are provided for holding the outer wheel hub 42 against axial movement, and for transmitting braking torque to the outer wheel. As embodied, the outer wheel hub 42 at its outer end is provided with an integral flange 48 extending radially inwardly and overlying the flanged end 50 of an axle shaft 51. Flange 50 has a circular periphery fitting the inner seat 51' of the hub end 48, and both the flange 50 and inturned hub end 48 are provided with a circular series of registering holes through which extend the bolts 52 by which the hub 42 and axle shaft 51 are restrained against independent rotation and axial movement.

Axle shaft 51 extends through the axle tube 10, and at its inner end is shouldered to receive ball bearing 54, the outer race of which is seated in collar 55 of the inner end of the axle tube 10, thereby rotatably mounting shaft 51 in the axle tube 10 and holding the shaft 51 coaxial with reference to the hubs 20 and 42.

When it is desired to replace an inner tire, or to change the inner wheel 30 for any reason, this can easily be accomplished by removal of the nuts from bolts 52, and with both wheels jacked up from the ground, the outer wheel 45 and its hub 42 may then be slid axially from the end of the inner wheel hub 20. With the outer wheel and hub removed the inner wheel mounting nuts 41 are accessible and may be removed thereby allowing removal of the inner wheel 30 and its tire with a minimum of time and trouble. The inner wheel 30 is remounted by reversing the steps recited above.

The outer wheel is, of course, demounted and remounted in the usual manner.

Separate braking means are provided for the two wheels. The inner wheel braking means comprises the cylindrical brake drum 60 which is mounted on the inner wheel mounting flange 26 by means of the slightly conical portion 61 which terminates in a centrally apertured disk portion 62, the parts 60, 61 and 62 preferably being integral. The disk portion 62 is apertured to receive the mounting screws 64 by which the brake drum is rigidly secured to the wheel mounting flange 26. The brake member 60, 61, 62 is preferably of such a size that it is substantially enclosed within the dish of the wheel and rim structure 30, 31 and is of a diameter to provide substantial clearance between the brake drum portion 60 and the rim 31. Cooperating with the brake drum 60 is conventional brake shoe mechanism 65 which is supported on brake anchor bracket 67 secured to the axle tube 10. Conventional means (not shown) may be provided for expanding the brake shoes 65 into frictional engagement with the brake drum 60.

Braking means for the outer wheel is mounted at the inner end of the axle tube 10, and is connected to the outer wheel through the axle shaft 51. As embodied there is provided a brake drum 70 which is rigidly fastened to a wheel-like member 71 by bolts 72. The hub portion 73 of the wheel-like member is splined to the inner end 74 of the axle shaft 51 and holds the inner race of ball bearing 54 tightly against the shoulder 57, and is held against accidental axial movement by means of the castellated nut 76. Ball bearing 54 is also held against movement with respect to the axle tube 10 by means of the shoulder 58, and the circular spring 59, this spring being seated in an interior annual groove at the inner end of the collar 55. Braking effort is applied to the drum 70 by means of the brake shoe mechanism 77 supported and held against rotation by means of the brake anchor 78 forming a portion of the collar 55. Suitable brake expansion means are also provided but are not shown and may be of conventional form.

In the operation of the embodiment shown in Figure 1, two of the dual wheel assemblies are connected to the semi-trailer by conventional springs holding their axle shafts 51 in alignment, with the inner ends of the axle tubes 10, and the outer wheel brake mechanism 70, 71 adjacent each other so that the wheeled portions of the assemblies are at the sides of the vehicle. Each of the inner wheels 30 is free to rotate about its axle tube 10, and the various bearings hold the wheels 30 and 45 in coaxial relation not only with respect to each other, but also with respect to the axle tube 10 and axle shaft 51, thereby permitting relative rotation of each of the wheels with respect to each other, as well as with respect to the axle tube 10. The inner wheel 30 is held against axial movement with respect to the axle tube 10 by means of the bearings 16 and 18, while the outer wheel 45 is normally held against axial movement with respect to the tube 10 and inner wheel 30 by means of the axle shaft 51 to which it is rigidly connected by the bolts 52.

As the brakes are applied, the retarding effort exerted on drum 60 is directly transferred to the flange 26 and thereby to the inner wheel 30. The braking effort applied to the outer wheel brake drum 70 is transferred through the splined shaft end 74, to the shaft 51, to the outer wheel hub 42 and outer wheel 45, thereby providing independent braking for each of the independently rotatable wheels.

As has been previously described, the inner wheel and tire may be removed or replaced by loosening the bolts 52 and removal of the outer wheel 45 and its hub 42.

Figure 2:
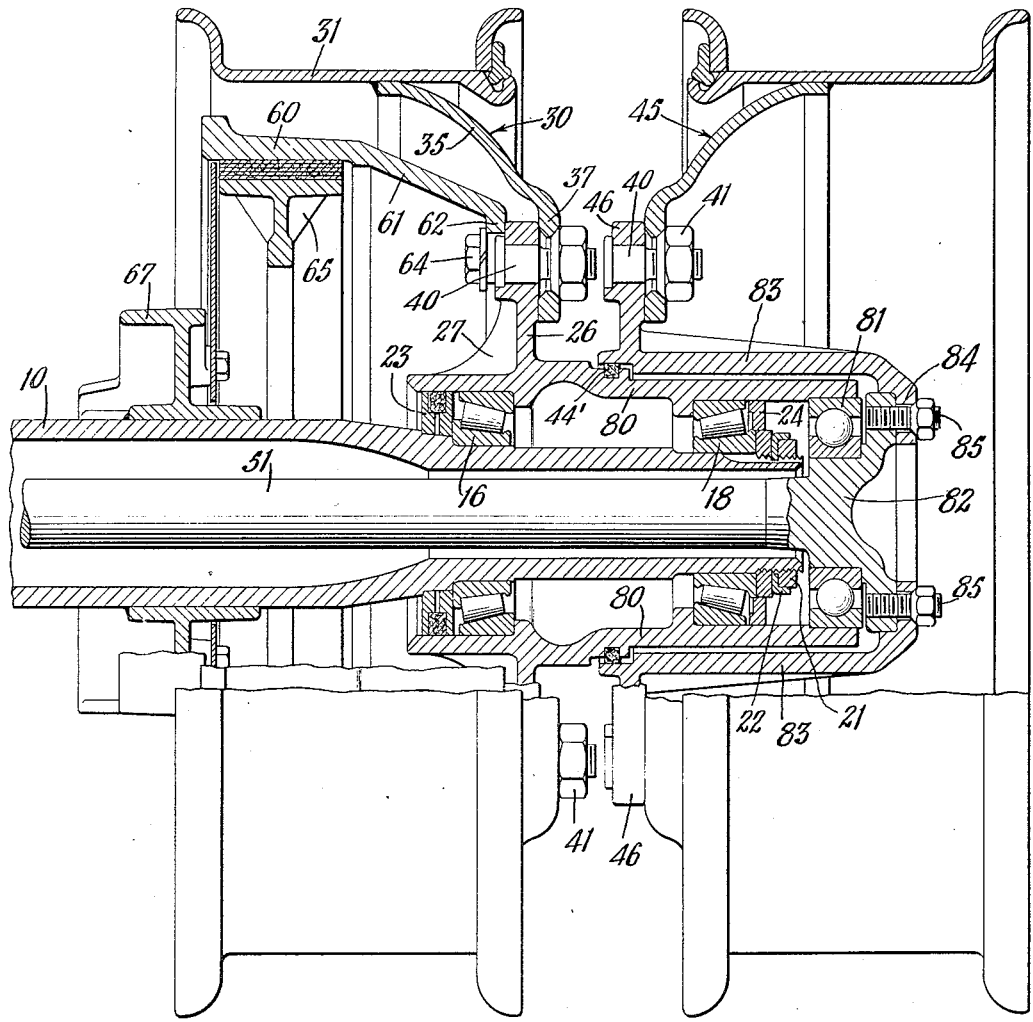
Figure 2 is a fragmentary longitudinal vertical section showing a modified embodiment of the invention.

Figure 2 of the drawings illustrates a modification of the invention, and this embodiment and the previously described embodiment differ principally in the provision of an anti-friction bearing between the axle shaft and the inner wheel hub. As illustrated the inner wheel hub 80 is provided with a portion extending outwardly beyond the bearing 18 and this portion is formed to receive the outer race of the ball bearing 81, the inner race of which is seated on the inner portion of the axle shaft end 82. The outer wheel hub 83 is similarly elongated, and is provided with a radially inturned flange 84 by which the hub is connected to the axle shaft end 82 through the studs 85.

In other respects the embodiment shown in Figure 2 may be and preferably is substantially similar to the embodiment of Figure 1.

In this embodiment the bearing 81 not only serves to maintain the axle shaft 51 concentric with the inner wheel hub 80 when the outer wheel hub 83 has been removed, but also relieves the axle shaft from all strain except that of the brake torque.

Figure 3:
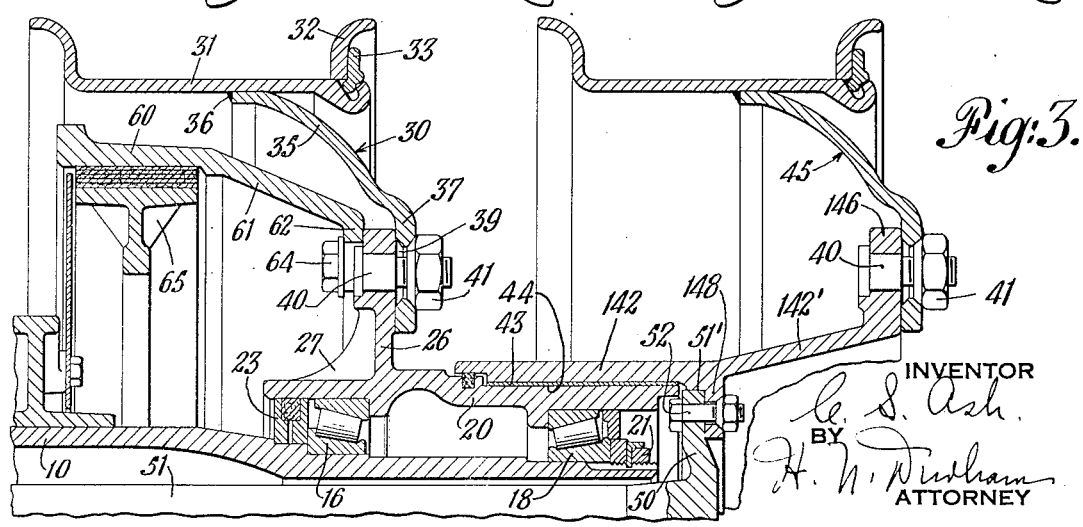
Figure 3 is a fragmentary longitudinal vertical section showing another modified embodiment of the invention.

Figure 3 of the drawings illustrates a modification of the form of the invention shown in Figure 1 and comprises means whereby the outer wheel may be demountably attached with its dished portion facing in the same direction as that of the inner wheel. As embodied the outer wheel hub 142 is provided with an outwardly extending slightly flared portion 142' upon the outer end of which is formed a radially extending flange 146 in which is arranged the wheel mounting studs 40 and nuts 41. At the point of union of hub 142 and flared portion 142' an inwardly extending flange 148 is provided, having apertures to accommodate the hub securing bolts 52 by which the hub 142 is secured to the axle head 50. Outer wheel hub 142 is journaled upon inner wheel hub 20 with an interposed bushing 43 in the same manner as that described for the form shown in Figure 1, and the remaining structure of the form shown in Figure 3 is also similar to that described in connection with Figure 1.

The invention in its broader aspects is not limited to the specific mechanisms shown and described but departures may be made therefrom within the scope of the accompanying claims without departing from the principles of the invention and without sacrificing its chief advantages.

What I claim is:

1. In a dual wheeled assembly, the combination of a pair of independently rotatable wheels, mounted side by side at the end of an axle tube, the inner wheel having an elongated hub on which the outer wheel is rotatably mounted by its hub and from which it may be removed by axial movement, an axle shaft held against axial movement relative to the axle tube and extending beyond the outer end of the inner wheel hub, the outer wheel hub being flanged to overlie and abut the axle shaft end, screw threaded means extending from the shaft end through apertures in the outer wheel hub flange to hold the outer wheel against axial movement and permit its removal from the inner wheel hub by release of said screw threaded means.

2. The dual wheeled assembly of claim 1 in which a brake member is mounted at the inner side of the inner wheel and is fast thereto and a second brake member is mounted at the inner end of the axle shaft and fast thereto.

3. The dual wheeled assembly of claim 1 in which the two wheels are oppositely dished, a brake drum is rigidly connected to the inner wheel within the dish of the inner wheel and a second brake drum is rigidly connected to the outer wheel through the axle shaft.

4. The dual wheeled assembly of claim 1 in which the two wheels are oppositely dished, a brake drum is rigidly connected to the inner wheel within the dish of the inner wheel and a second brake drum at the inner end of the axle shaft and rigidly connected to the outer wheel thereby.

CHARLES S. ASH.